US008379034B2

(12) United States Patent
Hwang et al.

(10) Patent No.: US 8,379,034 B2
(45) Date of Patent: Feb. 19, 2013

(54) CIRCUIT AND METHOD FOR COMPENSATING DISPLAY DEFECT IN VIDEO DISPLAY

(75) Inventors: Jong Hee Hwang, Goyang-si (KR); Hye Jin Kim, Seoul (KR); Ju Seong Park, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 744 days.

(21) Appl. No.: 12/318,023

(22) Filed: Dec. 19, 2008

(65) Prior Publication Data

US 2009/0303243 A1 Dec. 10, 2009

(30) Foreign Application Priority Data

Jun. 5, 2008 (KR) ........................ 10-2008-0053079

(51) Int. Cl.
*G06T 1/60* (2006.01)
*G09G 3/36* (2006.01)
*G09G 5/10* (2006.01)

(52) U.S. Cl. ........................... 345/530; 345/98; 345/690

(58) Field of Classification Search ........................ None
See application file for complete search history.

(56) References Cited

U.S. PATENT DOCUMENTS

| | | | | |
|---|---|---|---|---|
| 6,751,005 | B1 * | 6/2004 | Barnick et al. | 359/290 |
| 2007/0091042 | A1 * | 4/2007 | Chung et al. | 345/88 |

* cited by examiner

*Primary Examiner* — Kee M Tung
*Assistant Examiner* — Sing-Wai Wu
(74) *Attorney, Agent, or Firm* — McKenna, Long & Alridge, LLP.

(57) ABSTRACT

Circuit for compensating a display defect in a video display device of the present invention includes a memory having position information on a plurality of regular patterned defective regions of a display panel, gray scale section information, a defect level data on each of the regular patterned defective regions, and a plurality of compensation data on each of the defect level data stored therein, a first compensation unit, upon reception of data to be displayed on the regular patterned defective regions, for determining defect level data on the regular patterned defective regions of the data to be displayed, selecting a compensation data set on the defect level data determined thus, and selecting a compensation data on the data to be displayed from the compensation data selected thus, for compensating the data to be displayed, and a second compensator for distributing the data compensated thus at the first compensation unit spatially and temporally by using dither patterns for making fine compensation, thereby suppressing size increase of the compensation data.

5 Claims, 9 Drawing Sheets

CIRCUIT AND METHOD FOR COMPENSATING DISPLAY DEFECT IN VIDEO DISPLAY

This application claims the benefit of the Patent Korean Application No. P2008-053079, filed on Jun. 5, 2008, which is hereby incorporated by reference for all purposes as if fully set forth herein.

BACKGROUND OF THE INVENTION

1. Field of the Invention

The present invention relates to video display devices, and more particularly, to circuit and method for compensating a display defect in a video display device which can reduce a size of a memory which stores a compensation data on a plurality of regular patterned defective regions.

2. Discussion of the Related Art

Currently, as the video display devices, flat display devices, such as liquid crystal display device LCD, plasma display panel PDP, organic light emitting diode OLED, are used, mostly.

The video display device passes through an inspection process for detecting a display defect after finishing fabrication of a display panel which displays a video. Though the display panel having the display defect passes through a repair process for the defective portion, there can be display defect that can not be repaired even in the repair process.

The display defect is caused mostly by variation of exposure quantity come from superimposition of the exposures and aberration of multi-lens at the time of multi-exposure by an exposing apparatus used in a thin film pattern forming process. The variation of exposure quantity causes variation a width of the thin film pattern, to vary parasitic capacitance of the thin film transistor, a height of a column spacer which maintains a cell gap, and parasitic capacitance between signal lines. The variation causes brightness variation on a displayed video, resulting in the display defect. The display defect caused by the variation of exposure quantity is displayed on the display panel in transverse lines or longitudinal lines depending on a direction of the scan of the exposing apparatus. The display defect in a form of the transverse lines or longitudinal lines can not be solved even with modification of a process technology.

Moreover, the display defect can be displayed as a point defect from a defective pixel having foreign matters infiltrated therein. Though the defective pixel is repaired in the repair process, the point defect takes place even from the repaired pixel. For an example, if the defective pixel is turned into a dark point in the repair process, the pixel turned into a dark point can be displayed as a black point defect in a white mode video. If the repair process is performed, in which the pixel turned into a dark point is linked to an adjacent regular pixel, requiring that a data supplied to the regular pixel is spread and charged even to the repaired pixel linked thus to each other, it is liable that the linked pixels can be displayed as a point defect due to shortage of a data charge quantity.

A method is taken into consideration, in which the defect is compensated by a compensation data by means of a circuit. For an example, the Korean patent application No. 10-2006-0059285 filed by the applicant discloses a method for compensating a data to be displayed at a display defective region by a method in which the data to be displayed at the display defective region is converted by using the compensation data.

In order to make a large sized liquid crystal display device slimmer, which requires a direct lighting type back light unit, a gap between the liquid crystal display panel and the back light unit is reduced. According to this, due to shortage of a diffusing path from the back light unit, the liquid crystal display device can display a display defect in a form of transverse lines along positions of a plurality of lamps. For an example, the liquid crystal display device having 26 lamps applied thereto may have 26 lines of the transverse line defect due to the lamps. In this case, in order to compensate the 26 transverse line defect regions caused by the lamps respectively, it is required that a compensation data on each of the 26 transverse line defect regions is in storage according to defect levels. That is, a related art memory has a plurality of defect level data and a plurality of compensation data sets on each of the defect level data stored in a storage space for each of a plurality of regular patterned defective regions. According to this, if a number of the defective regions increases, a size of the compensation data increases, to increase a size of the memory, the related art compensation circuit has a production cost increased.

SUMMARY OF THE INVENTION

Accordingly, the present invention is directed to circuit and method for compensating a display defect in a video display device that substantially obviates one or more of the problems due to limitations and disadvantages of the related art.

An advantage of the present invention is to provide circuit and method for compensating a display defect in a video display device which can reduce a size of a memory which stores a compensation data on a plurality of regular patterned defective regions.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described herein, a circuit for compensating a display defect in a video display device includes a memory having position information on a plurality of regular patterned defective regions of a display panel, gray scale section information, a defect level data on each of the regular patterned defective regions, and a plurality of compensation data on each of the defect level data stored therein, a first compensation unit, upon reception of data to be displayed on the regular patterned defective regions, for determining defect level data on the regular patterned defective regions of the data to be displayed, selecting a compensation data set on the defect level data determined thus, and selecting a compensation data on the data to be displayed from the compensation data selected thus, for compensating the data to be displayed, and a second compensator for distributing the data compensated thus at the first compensation unit spatially and temporally by using dither patterns for making fine compensation.

The first compensation unit includes a grayscale determiner for selecting gray scale section information on the data to be displayed from the gray scale section information from the memory and forwarding the gray scale section information selected thus, a position determiner for forwarding position information on the defective regions for the data to be displayed and a number of detected times of the regular patterned defective regions according to direction information on the regular patterned defects from option pins from an outside of the circuit or the memory and the position information on the defective regions from the memory, a defect level data selection unit for retrieving and forwarding the defect level data from the memory according to the position information from the position determiner, a compensation data selector for selecting a compensation data set according to the defect level data from the defect level data selection unit, and selecting and forwarding a compensation data on the gray scale section information from the grayscale determiner from the compensation data set selected thus, an adder for adding the compensation data from the compensation data selector to the data to be displayed, a subtracter for subtracting the compensation data from the data to be displayed, a multiplexer for forwarding an order information on the regular patterned defective regions and gray scale information stored in the memory according to a number of detection times of the regular patterned defective regions detected at the position determiner selectively, and a multiplexer for selecting one of data either from the adder or the subtracter according to the order information on the regular patterned defective region and the gray scale information selected at the multiplexer thus.

The memory further includes point defect information on point defective region of the display panel, and the circuit further includes a bit expander for expanding bits of the data to be displayed and supplying the expanded bits to the first compensation unit, and a third compensator for compensating the data to be displayed from the second compensator by using the point defect information from the memory.

In another aspect of the present invention, a compensating method for a video display device includes the steps of storing position information on a plurality of regular patterned defective regions of a display panel, gray scale section information, a defect level data on each of the regular patterned defective regions, and a plurality of compensation data on each of the defect level data to a memory, determining the defect level data on the regular defective regions at the memory if it is determined that data to be displayed at the regular patterned regions are received with reference to the position information, selecting a compensation data set on the defect level data determined at the memory thus, compensating the data to be displayed on the regular defective regions by selecting the compensation data on the data to be displayed from the compensation data set selected thus, and distributing the data compensated thus spatially and temporally by using dither patterns for making fine compensation, and further includes the step of compensating the data to be displayed on the point defective region, if the data to be displayed is a data on the point defective region with reference to the point defect information from the memory.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
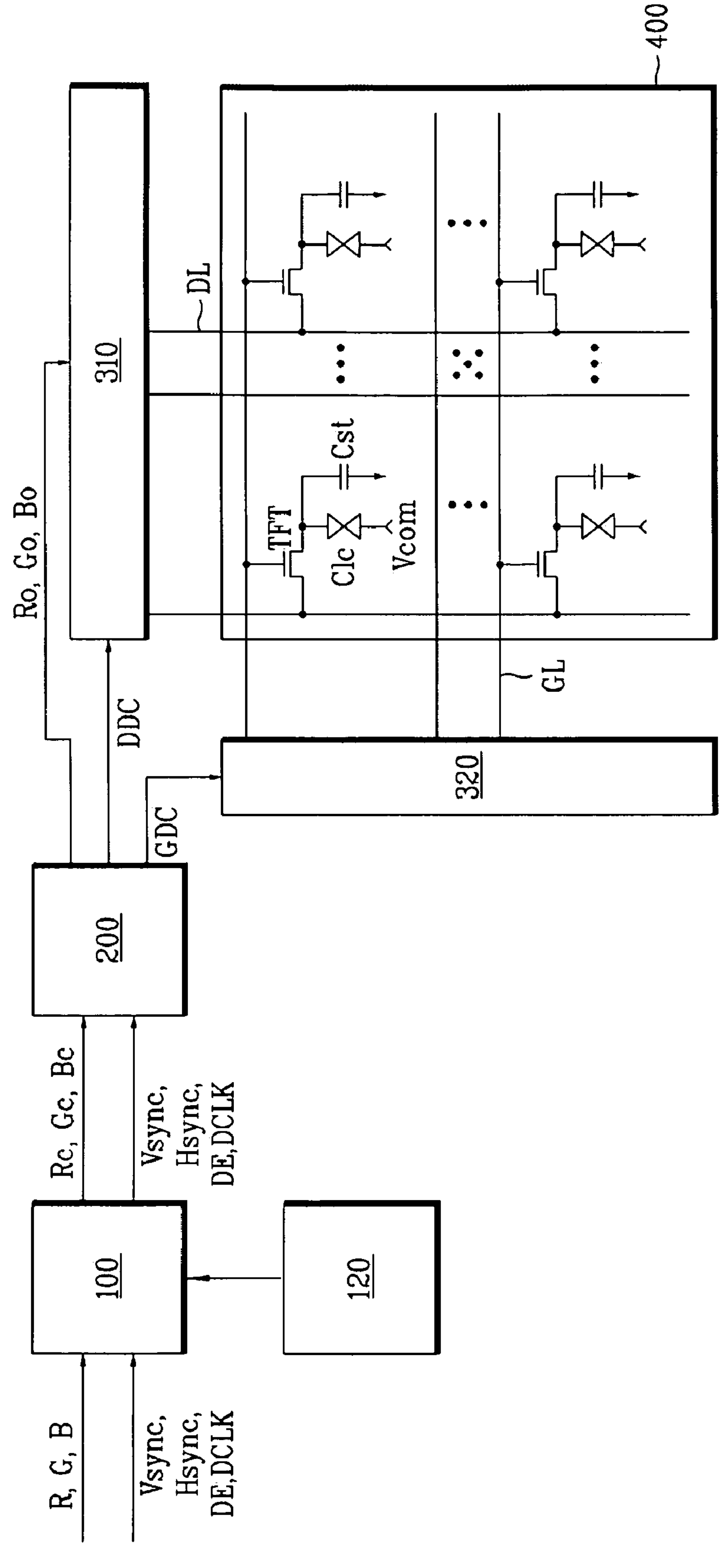
FIG. 1 illustrates a block diagram of a liquid crystal display device in accordance with a preferred embodiment of the present invention.

FIG. 1 illustrates a block diagram of a liquid crystal display device in accordance with a preferred embodiment of the present invention.

Referring to FIG. 1, the liquid crystal display device includes a compensation circuit 100, a timing controller 200, a data driver 310 and a gate driver 320 for driving a liquid crystal display panel 400, and a memory 120 connected to the compensation circuit 100. The compensation circuit 100 may be built-in the timing controller 200 to form a semiconductor chip.

The memory 120 has regular patterned defect information stored therein, including position information PD1 on regular patterned defective regions, such as transverse lines and/or longitudinal lines, gray scale section information GD1, a compensation data CD1, and a defect level data LD. The regular patterned defects, such as transverse lines or longitudinal lines, can take place due to a difference of exposure quantities in fabrication processes, or a plurality of lamps applied to a direct light type back light unit. The position information PD1 on regular patterned defective regions represented with the number of pixels of starting and end positions of each of the defective regions. For an example, in the position information PD1 on the regular patterned defective regions, starting and end positions of a main region and each of a plurality of sections of a boundary region of the regular patterned defective region are represented with the numbers of pixels respectively. The gray scale section information GD1 represents information on a plurality of gray scale sections divided according to gamma characteristics. The compensation data CD1, for compensation of a difference of brightness or color intensity of the defective region compared to a regular region, is stored sorted for each gray scale sections. The defect level data LD divides extents of the difference of brightness or color intensity of the defective region compared to a regular region, i.e., defect extent into levels, for an example, 10 levels. The defect level data LD on each of the regular patterned defective regions is determined in an inspection process of the liquid crystal display device, and a defect level data LD of each of the regular patterned defective regions determined thus in the inspection process is stored for each of the defective regions. The compensation data CD1 is stored, not according to each of the regular patterned defective regions, but as compensation data sets on each of the defect levels LD, and each of the compensation data sets includes a plurality of compensation data on each of the gray scales. According to this, the plurality of the defect level data, the plurality of compensation data sets on each of the defect level data are selectively used in compensation of data on the regular defective regions. According to this, a storage capacity of the memory can be reduced compared to a case when the plurality of defect level data and the plurality of compensation data sets on each of the defect level data are stored in each of storage spaces for the plurality of regular patterned defective regions of the memory. The compensation data CD1 on the regular patterned defective regions includes optimized correction values for the main region and each of the sections of the boundary region of each of the regular patterned defective regions. Moreover, the memory 120 stores point defect information including position information PD2, and gray scale information, compensation data CD2 on point defective regions.

The compensation circuit 100 receives data R, G, B externally, and a plurality of synchronizing signals Vsync, Hsync, DE, DCLK. The compensation circuit 100 compensates and forwards a data to be displayed on the regular patterned defective region by using the information PD1, GD1, CD1, LD on the regular defective region, such as transverse lines or the longitudinal lines stored in the external memory 120. The compensation circuit 100 expands numbers of bits of received data and has the compensation data applied to the received data expanded thus. Particularly, if the received data R, G, B are determined data to be displayed on the regular patterned defective region by using the position information PD1 on the regular patterned defective region, the compensation circuit 100 determines the defect level data LD for the regular patterned defective region by using the memory 120. Then, the compensation circuit 100 selects the compensation data set corresponding to the defect level data determined thus, selects the compensation data corresponding to the gray scale section information on the received data R, G, B from the selected compensation data set, adds/subtracts the selected compensation data to/from the received data R, G, B, to compensate the received data R, G, B on the regular patterned defective region. The compensation circuit 100 compensates the defective region dividing the defective region into the main region and the boundary region, and makes fine compensation by distributing the compensated data spatially and temporally by using an FRC dithering method. Moreover, the compensation circuit 100 compensates and forwards the data to be displayed on the point defective region by using the information PD2, GD2, and CD2 on the point defective region stored in the external memory 120. Also, the compensation circuit 100 supplies the data Rc, Gc, Bc compensated thus and the plurality of synchronizing signals Vsync, Hsync, DE, and DCLK to the timing controller 200. The compensation circuit supplies the data to be displayed on a regular region to the timing controller 200 without compensation.

The timing controller 200 aligns and forwards the data Rc, Gc, Bc from the compensation circuit 100 to the data driver 310. The timing controller 200 also generates and forwards a data control signal DDC for controlling a driving timing of the data driver 310 and a gate control signal GDC for controlling a driving timing of the gate driver 320 by using the plurality of synchronizing signals Vsync, Hsync, DE, and DCLK.

The data driver 310 converts the digital data Ro, Go, Bo from the timing controller 200 into analog data by using the gamma voltage in response to the data control signal DDC from the timing controller 200 and forwards the analog data converted thus to the data line in the liquid crystal display panel.

The gate driver 320 drives the gate lines in the liquid crystal display panel 400 in succession in response to the gate control signal GDC from the timing controller 200.

The liquid crystal display panel 400 displays an image by means of a pixel matrix having a plurality of pixels. Each of the pixels produces a desired color by means of combination of red, green, and blue sub-pixels which control transmissivity of a light as alignment of the liquid crystals varies in response to a data signal. Each of the sub-pixels has a thin film transistor TFT connected to a gate line GL and a data line DL, a liquid crystal capacitor CLc and a storage capacitor Cst connected to the thin film transistor TFT in parallel. The liquid crystal capacitor CLc charges a difference of voltages of the data signal supplied to the pixel electrode through the thin film transistor TFT and a common voltage supplied to a common electrode therein and drives the liquid crystals according to the charged voltage to control the light transmissivity. The regular patterned defective regions, such as the transverse lines or the longitudinal lines which can be included to the liquid crystal display panel 400 in view of a fabrication process, the regular patterned defective regions according to the positions of the direct lighting type lamps, and the point defective regions displays data compensated by the compensation circuit 100. According to this, a difference of brightness between a regular region and a defective region can be prevented in the liquid crystal display panel 400, to improve a picture quality.

Figure 2:
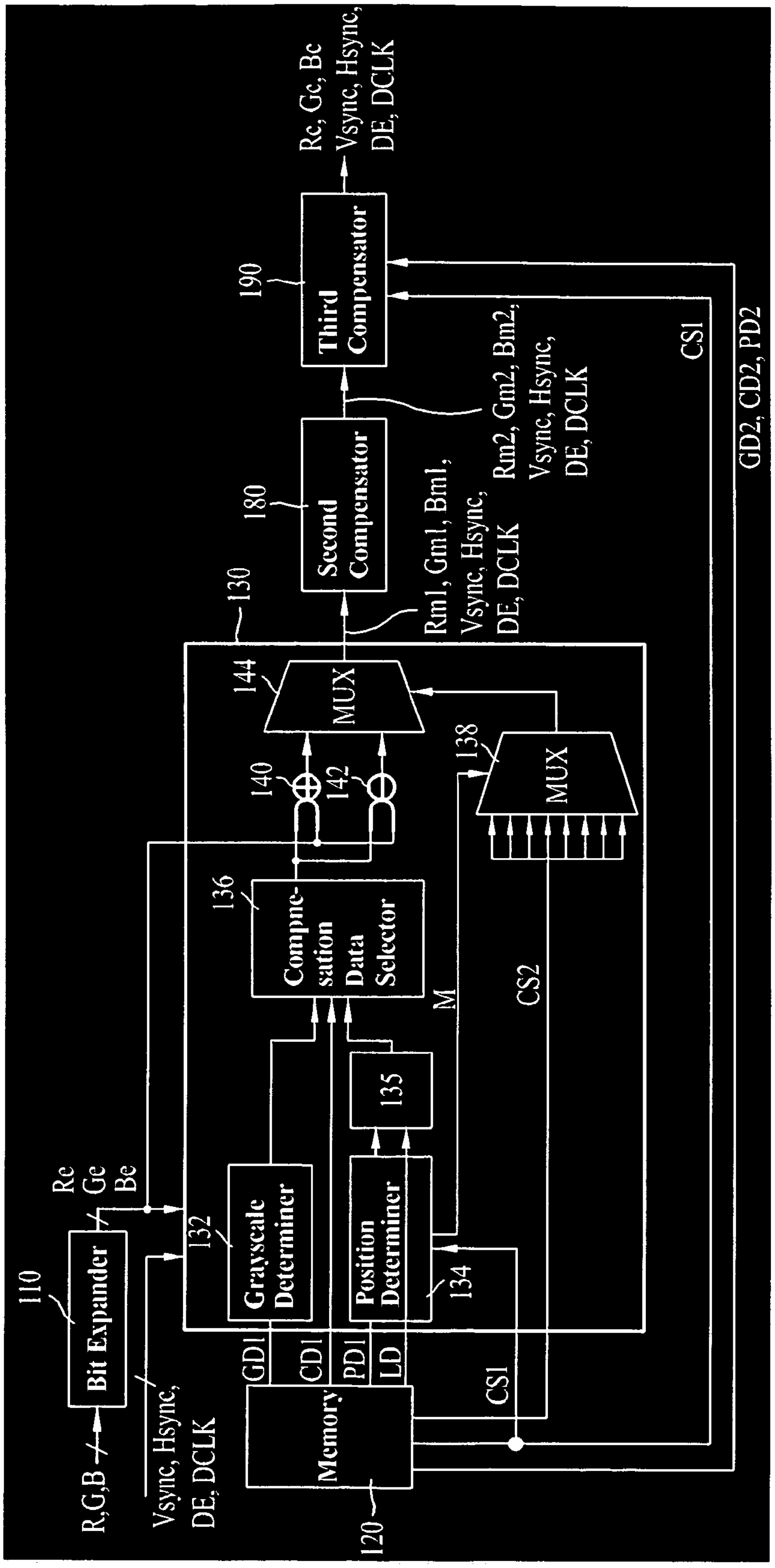
FIG. 2 illustrates a block diagram of the compensation circuit in FIG. 1.
Figure 3:
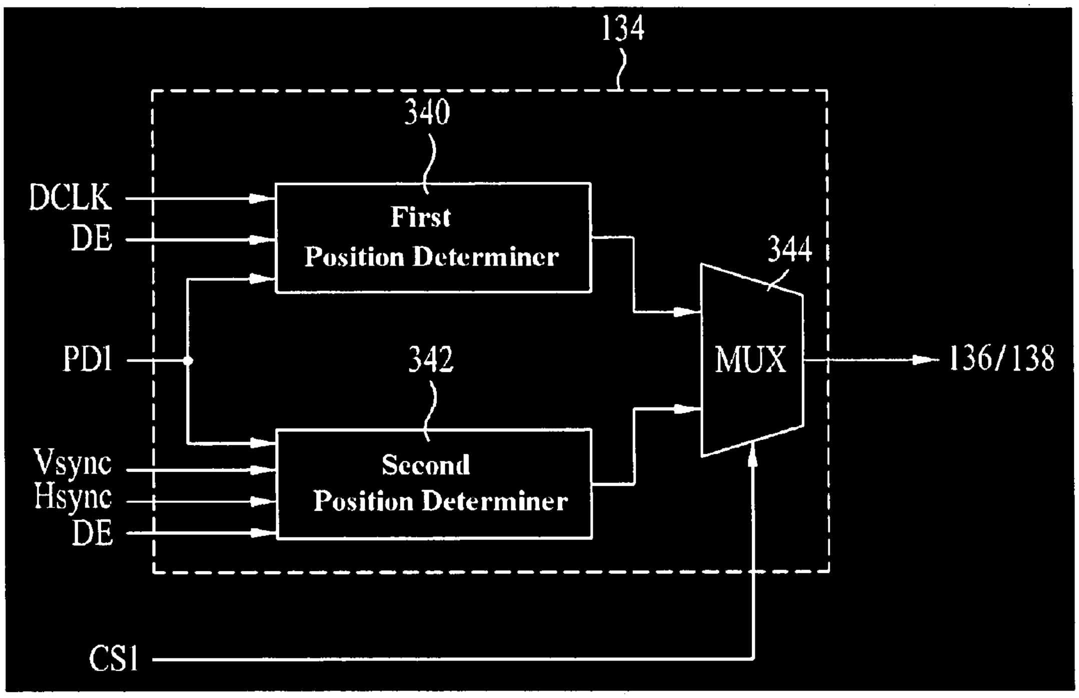
FIG. 3 illustrates a block diagram of the position determiner in FIG. 2.
Figure 4:
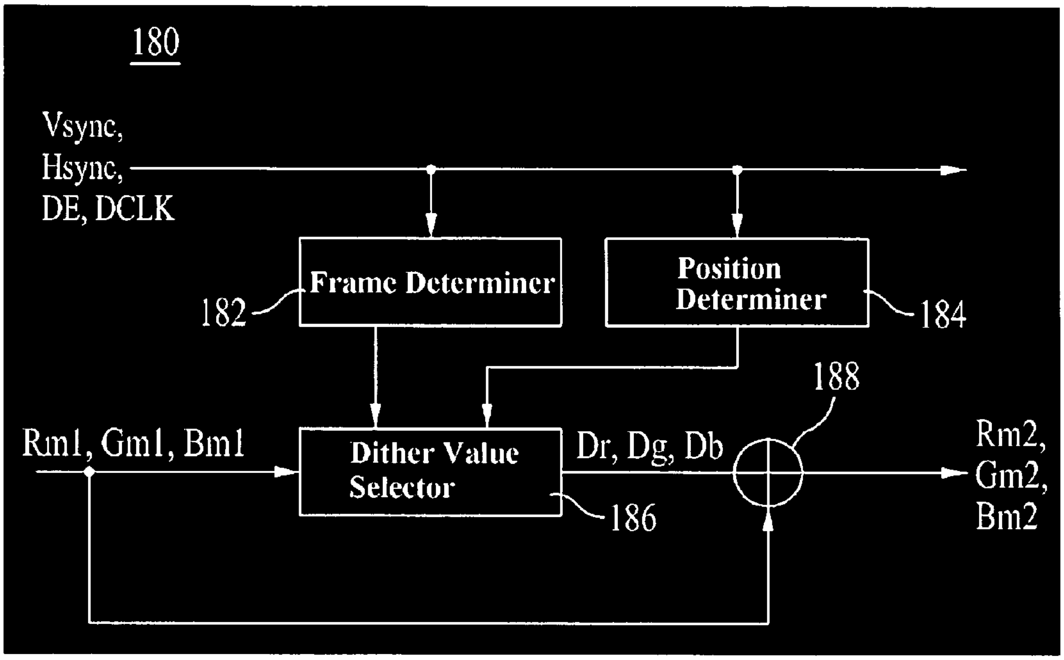
FIG. 4 illustrates a block diagram of the second compensator in FIG. 2.
Figure 5A:
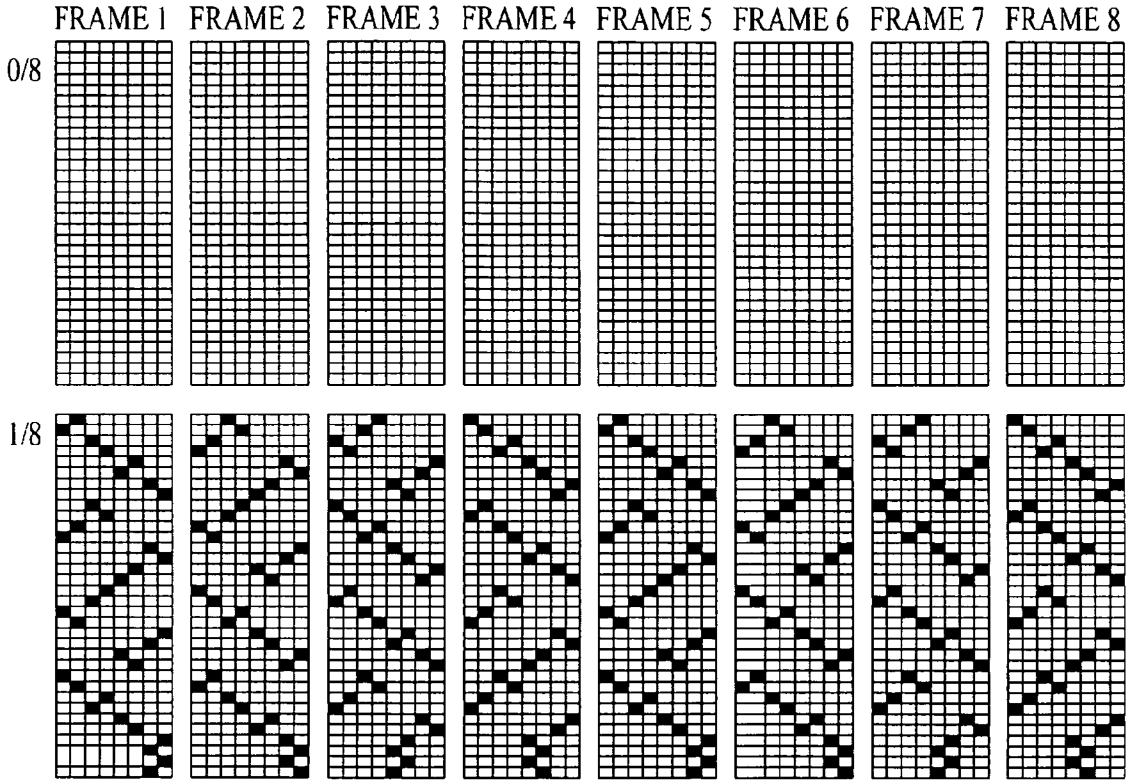
FIGS. 5A-5D illustrate dither patterns stored in the dither value selector in FIG. 4, respectively.
Figure 5B:
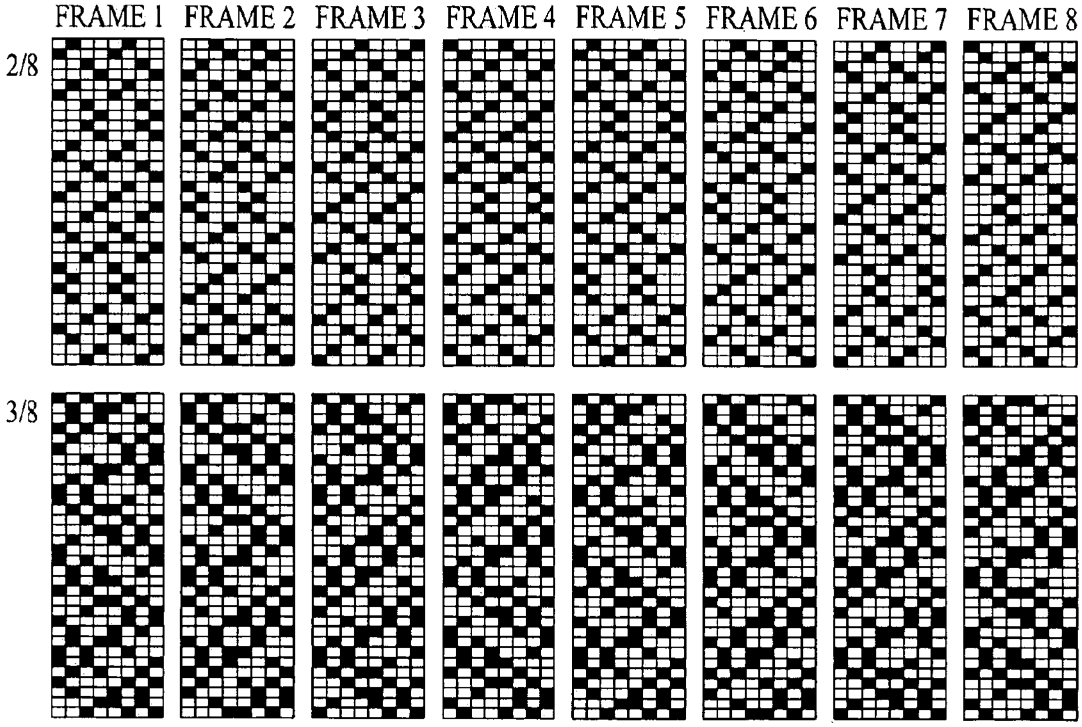
Figure 5C:
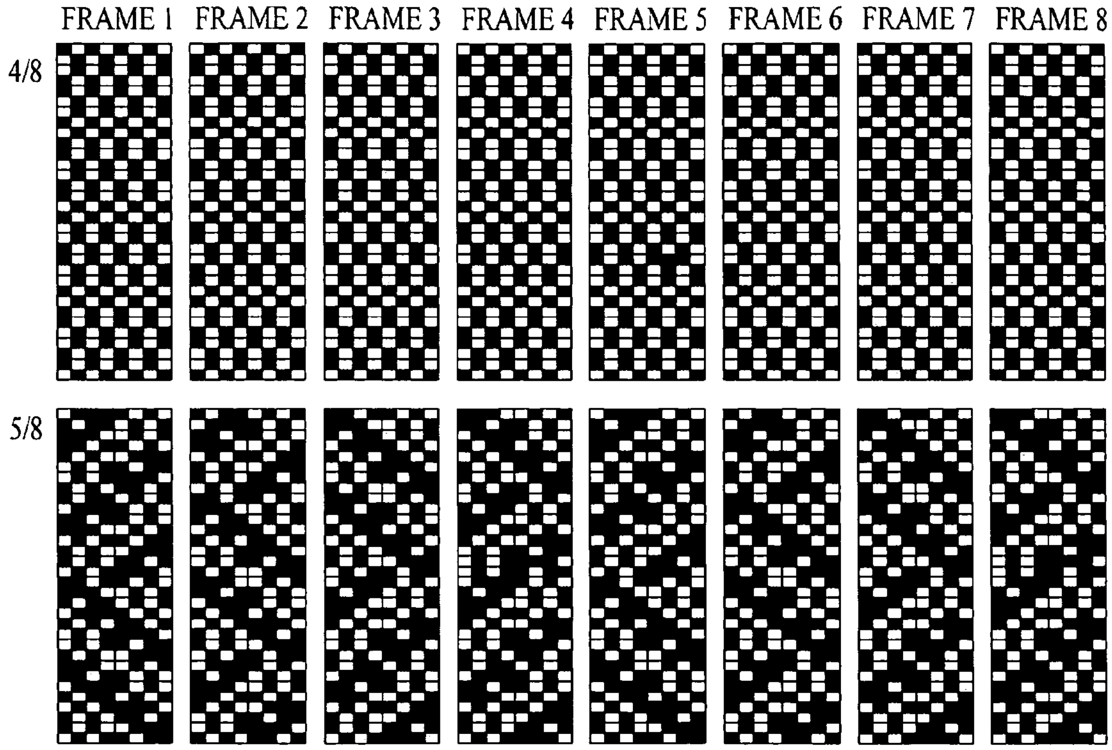
Figure 5D:
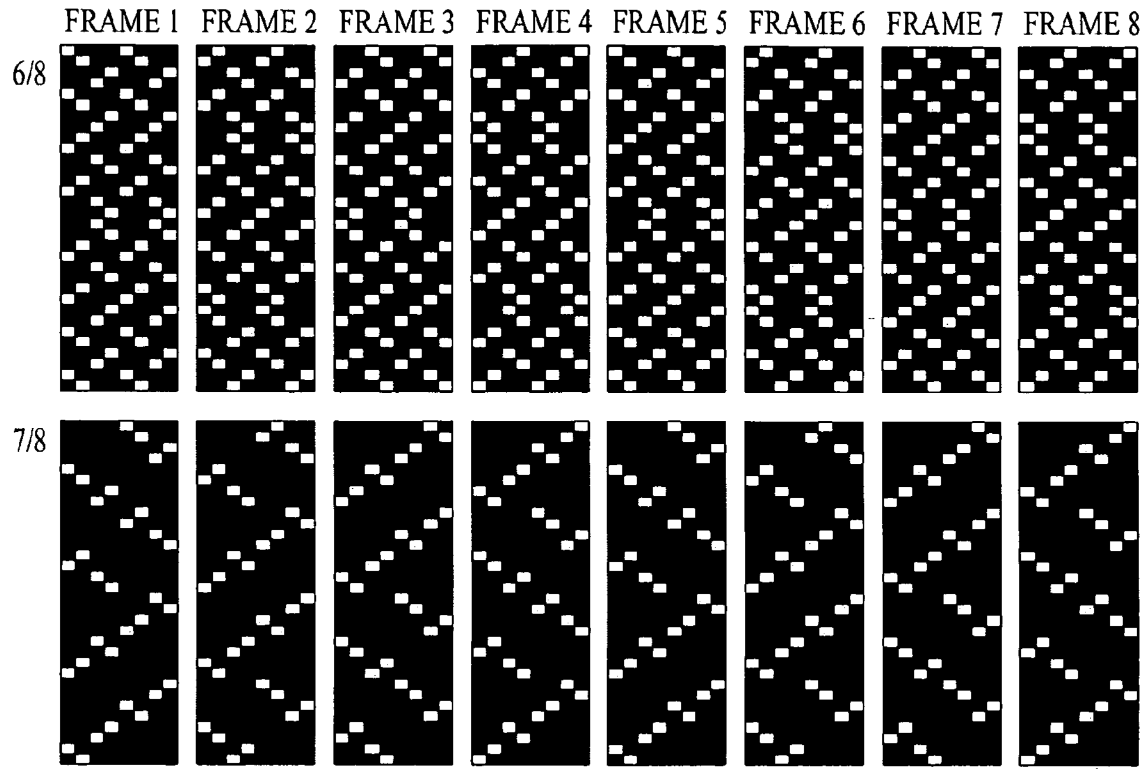
Figure 6:
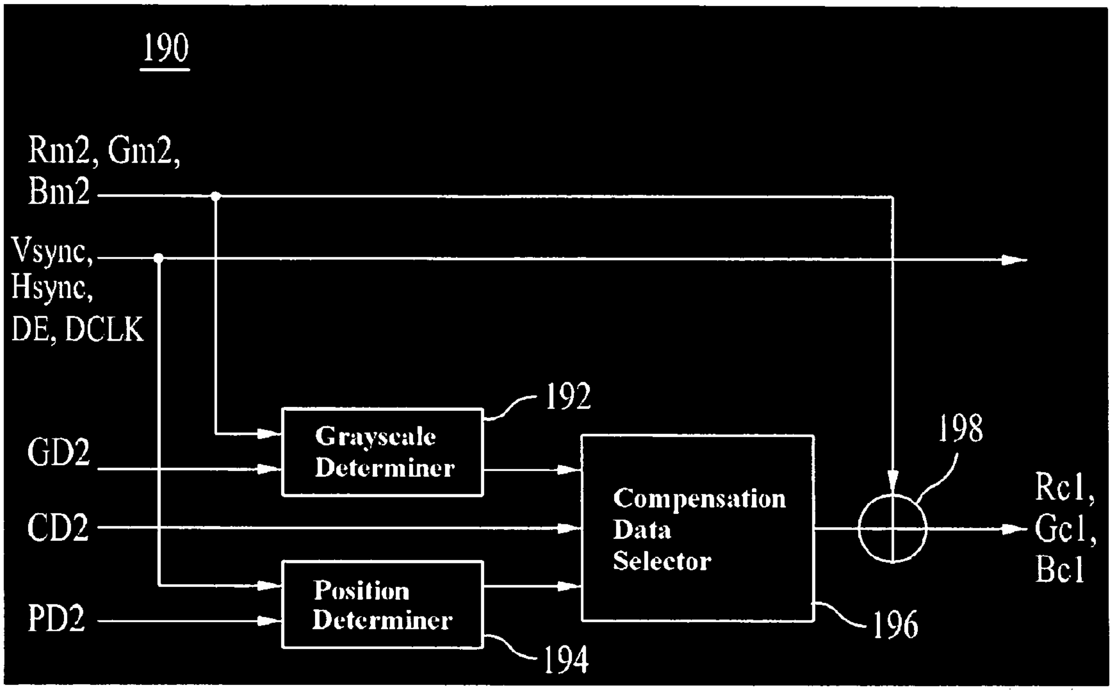
FIG. 6 illustrates a block diagram of the third compensator in FIG. 3.

FIG. 2 illustrates a block diagram of the compensation circuit 100 in FIG. 1, FIG. 3 illustrates a block diagram of the position determiner 134 of the first compensation unit 130 in FIG. 2, FIG. 4 illustrates a block diagram of the second compensator 180 in FIG. 2, FIGS. 5A~5D illustrate a plurality of dither patterns stored in the dither value selector 186 in FIG. 4 respectively, and FIG. 6 illustrates a block diagram of the third compensator 190 in FIG. 3.

Referring to FIG. 2, the compensation circuit 100 includes a bit expander 110, a first compensation unit for compensating data on the regular patterned regions at the data Re, Ge, Be from the bit expander 110, a second compensating unit 180 for making fine compensation of data Rm1, Gm1, Bm1 compensated in the first compensation unit 130 thus by an FRC dithering method, and a third compensator 190 for compensating data on the point defective region at the data Rm1, Gm1, Bm1 from the second compensator 180.

The memory 120 has the regular patterned defect information PD1, CD1, GD1, and LD and the point defect information PD2, CD2, and GD2 stored therein. The regular patterned defect information PD1, CD1, GD1, and LD is the transverse line defective region information or the longitudinal line defective region information. The memory 120 may also have first control information CS stored therein which includes direction information on the regular patterned defective region which indicate whether the regular patterned defective region has the transverse line defect or the longitudinal line defect, regular patterned defect compensation requirement information which indicates presence of the regular patterned defective region for indicating whether compensation of the regular patterned defective region is required or not, and point compensation requirement information for indicating whether the point defective region is compensated or not. For an example, of three bytes allocated to the first control information CS, each of 3 bit data of one byte thereof represent the direction information on the regular patterned defective region, the regular patterned defect compensation requirement information, and the point compensation requirement information. In the meantime, the first information CS may be set as values of three option pins of the timing controller 200 having the compensation circuit 100 built therein. Moreover, the memory 120 may have second control information CS2 stored therein, which includes gray scale information (that is, brightness/darkness information) on the regular patterned defective region which indicates whether the regular patterned defective region is a defect brighter or darker than the regular region together with order information on the plurality of regular patterned defective regions.

The bit expander 110 expands bits of the data R, G, B received from an outside of the circuit and supplies to the first compensation unit 130. For an example, the bit expander 110 adds dummy 3 bits 000 to a rear of the least significant bit of 8 bits of each of the data R, G, B to expand the data R, G, B into 11 bits respectively, and supplies the data Re, Ge, Be each expanded to 11 bits thus to the first compensation unit 130.

The first compensation unit 130 compensates and forwards the data Re, Ge, Be to be displayed at the regular patterned defective region, such as the transverse line or the longitudinal line by using the regular patterned defect information PD1, GD1, CD1, and LD from the memory 120. To do this, the first compensation unit 130 includes a grayscale determiner 132, a position determiner 134, a defect level data selection unit 135, a compensation data selector 136, an adder 140, a subtracter 142, and multiplexers 134, and 144.

The grayscale determiner 132 analyzes gray scale values of the data Re, Ge, Be, selects gray scale section information having the data Re, Ge, Be included thereto respectively from the gray scale section information GD1 retrieved from the memory 120, and forwards the gray scale section information selected thus to the compensation data selector 136. The gray scale section information GD1 may be divided 256 gray scales into 6 gray scale sections (gray scale section 1: 30~70 gray scales, gray scale section 2: 71~120 gray scales, and so on) according to gamma characteristics. The grayscale determiner 132 selects and forwards the gray scale section information including the gray scale values of the data Re, Ge, Be from the 6 sets of gray scale section information.

The position determiner 134 determines pixel positions in the transverse direction or the longitudinal direction of the data Re, Ge, Be by using at least one synchronizing signal among the vertical synchronizing signal Vsync, the horizontal synchronizing signal Hsync, the data enable signal DE, the dot clock DCLK, counts a number of detection times M of the regular patterned defective regions, and forwards to the multiplexer 138.

In detail, referring to FIG. 3, the position determiner 134 includes a first position determiner 340 for determining the pixel position in the longitudinal direction of the data Re, Ge, Be, a second position determiner 342 for determining the pixel position in the transverse direction of the data Re, Ge, Be, and a multiplexer 344 for selecting a data from the first position determiner 340 or the second position determiner 342 according to the regular patterned defect direction information included to the first control information CD1.

Referring to FIG. 3, the first position determiner 340 counts the dot clock DCLK in an enable period of the data enable signal DE to determine the pixel position in the longitudinal direction of the data Re, Ge, Be. The first position determiner 340 compares the pixel positions of the data Re, Ge, Be to the regular patterned defective region information PD1, and selects the regular patterned defective region information if detected to be the transverse line defective region and forwards to the multiplexer 344. The first position determiner 340 also counts a number M of detection times of the transverse line defective regions and forwards to the multiplexer 138.

The second position determiner 342 counts the horizontal synchronizing signal Hsync in a period both the vertical synchronizing signal Vsync and the data enable signal DE are enabled at the same time to determine the pixel position in the transverse direction of the data Re, Ge, Be. The second position determiner 342 compares the pixel positions of the data Re, Ge, Be to the regular patterned defective region information PD1, and selects the regular patterned defective region information if detected to be the longitudinal line defective region and forwards to the multiplexer 344. The second position determiner 342 also counts a number M of detection times of the longitudinal line defective regions and forwards to the multiplexer 138.

The multiplexer 344 supplies the position information on the regular patterned defective region received from the first position determiner 340 or the second position determiner 342 to the defect level data selection unit 135 according to the regular pattern direction information included to the first control information CS1, and a number M of detection times of the defective regions to the multiplexer 138. That is, if the first control information CS1 indicates the transverse line defective region, the multiplexer 344 supplies the position information from the first position determiner 340 to the detect level data selection unit 135, and a number M of detection times of the defective regions to the multiplexer 138. Opposite to this, if the first control information CS1 indicates the longitudinal line defective region, the multiplexer 344 supplies the position information from the second position determiner 342 to the detect level data selection unit 135, and a number M of detection times of the defective regions to the multiplexer 138.

Referring to FIG. 2, the defect level data selection unit 135 retrieves the defect level data LD corresponding to the position information from the position determiner 134 from the memory 120 and supplies the defect level data LD to the compensation data selector 136.

The compensation data selector 136 retrieves and a plurality of compensation data sets on the plurality of the defect level data LD from the memory 120 and stores therein, selects the plurality of compensation data sets on the plurality of the defect level data selected at the defect level data selection unit 135, selects and forwards the compensation data on the gray scale section information selected at the grayscale determiner 132 from the compensation data sets selected thus. For an example, the compensated data has a 10 bit size.

The adder 140 adds the compensation data from the compensation data selector 136 to the data Re, Ge, Be and forwards the data added thus. The subtracter 142 subtracts the compensation data from the compensation data selector 136 from the data Re, Ge, Be, and forwards the data subtracted thus.

The multiplexer 138 forwards brightness/darkness information on the regular patterned defective region in succession in an order of the regular patterned defective region to control the multiplexer 144 which selects data from the adder 140 or the subtracter 142. The brightness/darkness information on the regular patterned defective region is stored in the memory 120 as the second control information CS2 together with the order information on the regular patterned defective regions. The multiplexer 138 selects one of the second control information CS2 retrieved from the memory 120 according to a number M of detection times of the regular patterned defective regions from the position determiner 134 and forwards the second control information CS2 selected thus to the multiplexer 144. The multiplexer 144 selects the data from the adder 140 or the subtracter 142 according to the brightness/darkness information included to the second control information CS2 from the multiplexer 138 and forwards the data selected thus to the second compensator 180.

The second compensator 180 distributes the data Rm1, Gm1, Bm1 compensated at the first compensation unit 130 spatially and temporally by the FRC dithering method for making fine compensation of the brightness. To do this, the second compensator 180 includes a frame determiner 182, a position determiner 184, a dither value selector 186, and an adder 188.

The frame determiner 182 counts the vertical synchronizing signal Vsync among the plurality of synchronizing signals Vsync, Hsync, DE, DCLK to detect a number of frames, and forwards frame number information detected thus to the dither value selector 186.

The position determiner 184 counts the dot clock DCLK in an enable period of the data enable signal DE to detect a longitudinal position of the data Rm1, Gm1, Bm1, counts the horizontal synchronizing signal Hsync in a period both the vertical synchronizing signal Vsync, and the data enable signal DE are enabled at the same time, to detect the transverse position of the data Rm1, Gm1, Bm1, and forwards pixel position information detected thus to the dither value selector 186.

The dither value selector 186 selects and forwards dither values Dr, Dg, and Db for the plurality of dither patterns by using the gray scale values of lower 3 bits of each of the data Rm1, Gm1, Bm1 compensated at the first compensation unit 130, frame number information from the frame determiner 182, and pixel position information from the pixel position determiner 184.

Referring to FIGS. 5A~5D, the dither value selector 186 has a plurality of dither patterns stored therein in forms of look up tables each with 8*32 size, in which a number of pixels with a dither value "1" (black color) are arranged to increase gradually according to gray scale values of 0, ⅛, 2/8, 3/8, 4/8, 5/8, 6/8, 7/8, 1 (the dither pattern with a gray scale value 1 is not shown). The dither value selector 186 also has a plurality of dither patterns stored therein, in which positions of the pixels having the dither values "1" are different with frames, i.e., positions of the pixels having the dither values "1" are different in each of the FRAME1~FRAME8 even for the same gray scale values. In other words, the dither value selector 186 has a plurality of dither patterns different with gray scales and frames from one another stored therein. Sizes of the dither patterns and a position of the pixel having the dither value "1" in each of the dither patterns may vary with needs of designers. The spatial and temporal distribution of the data Rm1, Gm1, Bm1 compensated at the first compensation unit 130 by the dither patterns enables to make fine compensation of a brightness difference at the regular patterned defective regions.

The least significant 3 bits of the 11 bits of each of the data Rm1, Gm1, Bm1 from the first compensation unit 130 are supplied to the dither value selector 186, and rest 8 bits are supplied to the adder 188. The dither value selector 186 selects gray scale values of the least significant 3 bits for each of the data Rm1, Gm1, Bm1, and one dither pattern of a number of frames from the frame determiner 182 from the dither patterns as shown in FIGS. 5A~5D, and selects dither values Dr, Dg, and Db of one bits respectively for each of the pixel positions of the data Rm1, Gm1, Bm1 from the dither values selected thus by using the pixel position information from the position determiner 184 and forwards the dither values Dr, Dg, and Db selected thus to the adder 188.

The adder 188 respectively adds upper 8 bits of each of the data Rm1, Gm1, Bm1 to the dither values Dr, Dg, and Db selected at the dither value selector 186 and forwards to the multiplexer 170.

Referring to FIG. 2, the third compensator 190 compensates the data Rm2, Gm2, Bm2 to be displayed on the point defective region by using the point defect information PD2, GD2, CD2 stored in the memory 120. The third compensator 190 forwards data of regular regions without compensation. To do this, as shown in FIG. 3, the third compensator 190 includes a grayscale determiner 192, a position determiner 194, a compensation data selector 196, and a computing unit 198.

Referring to FIG. 6, the grayscale determiner 192 analyzes gray scale value of each of the data Rm2, Gm2, Bm2 to be supplied to a link pixel at the point defective region, and selects gray scale section information having the data Rm2, Gm2, Bm2 included thereto respectively from the gray scale section information GD2 from the memory 120, and forwards to the compensation data selector 196.

The position determiner 194 determines pixel positions of the data Rm2, Gm2, Bm2 by using at least one synchronizing signal among the vertical synchronizing signal Vsync, the horizontal synchronizing signal Hsync, the data enable signal DE, and the dot clock DCLK. For an example, the position determiner 194 counts the dot clock DCLK in an enable period of the data enable signal DE, to detect the longitudinal position of the data Rm2, Gm2, Bm2, and counts the horizontal synchronizing signal Hsync in a period the vertical synchronizing signal Vsync and the data enable signal DE are enabled at the same time, to detect a pixel transverse position of the data Rm2, Gm2, Bm2. The position determiner 194 compares the pixel position of the data Rm2, Gm2, Bm2 detected thus to the position information PD2 of the point defective region from the memory 120, and if turned out to be the point defective region, forwards the pixel position information detected thus to the compensation data selector 196.

The compensation data selector 196 selects and forwards compensation data on the data Rm2, Gm2, Bm2 from the compensation data CD1.

The computing unit 178 adds/subtracts to/from and forwards the compensation data and the data Rm2, Gm2, Bm2 from the compensation data selector 196.

The circuit and method for compensating a display defect in a video display device has the following advantages.

Thus, the circuit for compensating a display defect in a video display device of the present invention stores a plurality of defect level data and a plurality of compensation data sets on each of the defect levels as forms of look up tables in an external memory for shared use at the time of compensation of data of the plurality of regular patterned defective regions. According to this, the first compensation unit can compensate the data of the regular patterned defective region by determining the defect level data of each of the regular patterned defective regions at the memory, selecting a compensation data set of the defect level data determined thus, selecting a compensation data of gray scale section information included to a gray scale value of the data received from an outside of the circuit from the compensation data set selected thus, and adding/subtracting the compensation data selected thus to/from the data received from an outside of the circuit. According to this, a storage capacity of the memory can be made smaller than a case a plurality of defect level data and a plurality of compensation data sets on each of the defect level data are stored in storage spaces for a plurality of regular patterned defective regions of the memory. According to this, even in a case a large amount of regular patterned defective regions taking place at the time of application of a direct lighting type back light unit, a size of the compensation data to be stored in the memory can be reduced.

In the meantime, the compensation circuit of the present invention is applicable not only to the liquid crystal display device, but also to other video display devices, such as OLED, PDP, and so on.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A circuit for compensating a display defect in a video display device comprising:

a memory storing position information on a plurality of defective regions of a display panel, gray scale section information, defect level data respectively corresponding to the defective regions, a plurality of compensation data sets respectively corresponding to the defect level data, direction information on the defective regions, an order information respectively corresponding to the defective regions, and brightness/darkness information respectively corresponding to the defective regions, wherein each of the defect level data indicates defect extent of the corresponding defective region compared to a regular region and each of the compensation data sets includes a plurality of compensation data divided for gray scale sections;

a first compensation unit, upon reception of data to be displayed on the defective regions, determining defect level data on the corresponding defective region of the data to be displayed, selecting the compensation data set corresponding to the determined defect level data, selecting a compensation data corresponding to the data to be displayed in the selected compensation set, and for compensating the data to be displayed using the selected compensation data; and a second compensator distributing the compensated data from the first compensation unit spatially and temporally by using dither patterns for making fine compensation, wherein the first compensation unit includes:

a grayscale determiner selecting a gray scale section information corresponding to the data to be displayed in the gray scale section information from the memory, a position determiner detecting position information on the corresponding defective region for the data to be displayed in the position information from the memory and a number of detected times of the defective regions according to the direction information on the defective regions from the memory, a defect level data selection unit selecting a defect level data on the corresponding defective region in the defect level data from the memory according to the detected position information from the position determiner, a compensation data selector selecting a compensation data set corresponding to the defect level data from the defect level data selection unit in the compensation sets from the memory, and selecting a compensation data corresponding to the selected gray scale section information from the grayscale determiner in the selected compensation data set, an adder adding the selected compensation data from the compensation data selector to the data to be displayed, a subtracter subtracting the selected compensation data from the data to be displayed, a first multiplexer selecting a brightness/darkness information corresponding to the defective region in the brightness/darkness information on the defective regions stored in the memory according to the detected number of detection times of the defective regions from the position determiner and the order information on the defective regions from the memory, and a second multiplexer selecting one of the compensated data either from the adder or the subtracter according to the selected brightness/darkness information from the first multiplexer.

2. The circuit as claimed in claim 1, wherein the memory further includes point defect information on point defective regions of the display panel, and the circuit further comprising;

a bit expander expanding bits of the data to be displayed and supplying the expanded bits to the first compensation unit; and a third compensator compensating data to be displayed on the point defective regions in the output data from the second compensator by using the point defect information from the memory.

3. The circuit as claimed in claim 1, wherein the position determiner includes;

a first position determiner determining a pixel position in the longitudinal direction on the display panel, comparing the determined pixel position to the position information from the memory, selecting the position information corresponding to a transverse line defective region, and detecting the number of detected times of the transverse line defective region;

a second position determiner determining a pixel position in the transverse direction on the display panel, comparing the determined pixel position to the position information from the memory, selecting the position information corresponding to a longitudinal line defective region, and detecting the number of detected times of the longitudinal line defective region; and a third multiplexer selecting the position information on the defective region and the number of detected times from the first position determiner or the second position determiner according to the direction information on the defective region and supplying to the selected position information and the number of detected times to the defect level data selection unit;

wherein the third multiplexer selects the output from the first position determiner if the direction information on the defective region indicates the transverse line defective region and selects the output from the second position determiner if the direction information on the defective region indicates the longitudinal line defective region.

4. A method for compensating a display defect in a video display device comprising the steps of:

storing position information on a plurality of defective regions of a display panel, gray scale section information, a defect level data respectively corresponding to the defective regions, a plurality of compensation data sets respectively corresponding to of the defect level data, direction information on the defective regions, an order information respectively corresponding to the defective regions, and brightness/darkness information respectively corresponding to the defective regions in a memory, wherein each of the defect level data indicates defect extent of the corresponding defective region compared to a regular region and each of the compensation data sets includes a plurality of compensation data divided for gray scale sections;

if it is determined that data to be displayed at the defective regions are received with reference to the position information, selecting a gray scale section information corresponding to the data to be displayed in the gray scale section information from the memory;

detecting position information on the corresponding defective regions for the data to be displayed in the position information from the memory and a number of detected times of the defective regions according to the direction information on the defective regions from memory;

selecting a defect level data on the corresponding defective region in the defect level data from the memory according to the detected position information;

selecting a compensation data set corresponding to the selected defect level data in the compensation sets from the memory;

selecting a compensation data corresponding to the selected gray scale section information in the selected compensation data set;

selecting a brightness/darkness information corresponding to the defective region in the brightness/darkness information stored in the memory according to the detected number of detection times of the defective regions and the order information on the defective regions from the memory;

adding the selected compensation data to the data to be displayed;

subtracting the selected compensation data from the data to be displayed;

selecting the data compensated by adding or subtracting according to the selected brightness/darkness information; and distributing the compensated data selected spatially and temporally by using dither patterns for making fine compensation.

5. The method as claimed in claim 4, wherein the memory further includes point defect information on the point defective regions of the display panel, and the method further comprising the step of compensating the data to be displayed on the point defective region, if the data to be displayed is a data on the point defective region with reference to the point defect information from the memory.

* * * * *